July 22, 1969  O. L. HOLCOMB, JR  3,456,768
DISC ELEMENT CONSTRUCTION FOR DISC BRAKE
Filed Nov. 20, 1967  5 Sheets-Sheet 5
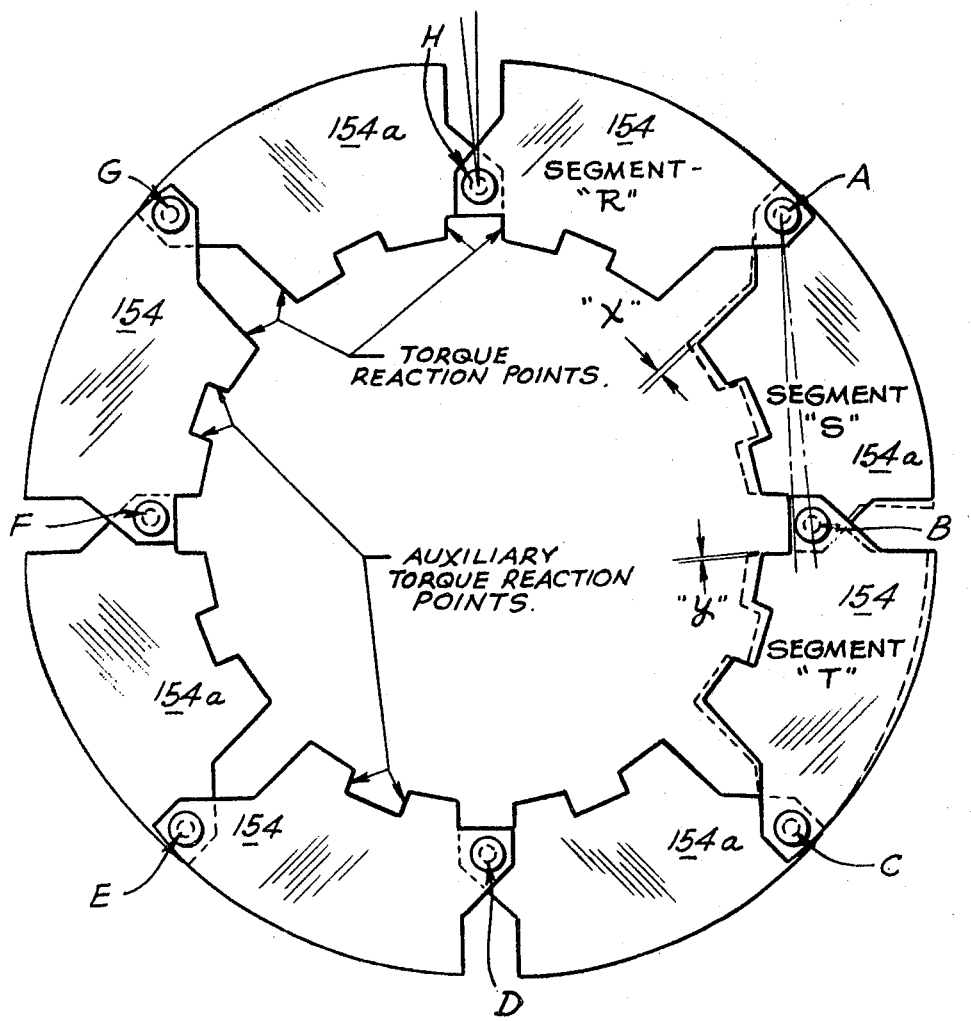
FIG_12
INVENTOR.
ORLA L. HOLCOMB, JR.
BY
*William N. Antonis*
ATTORNEY.

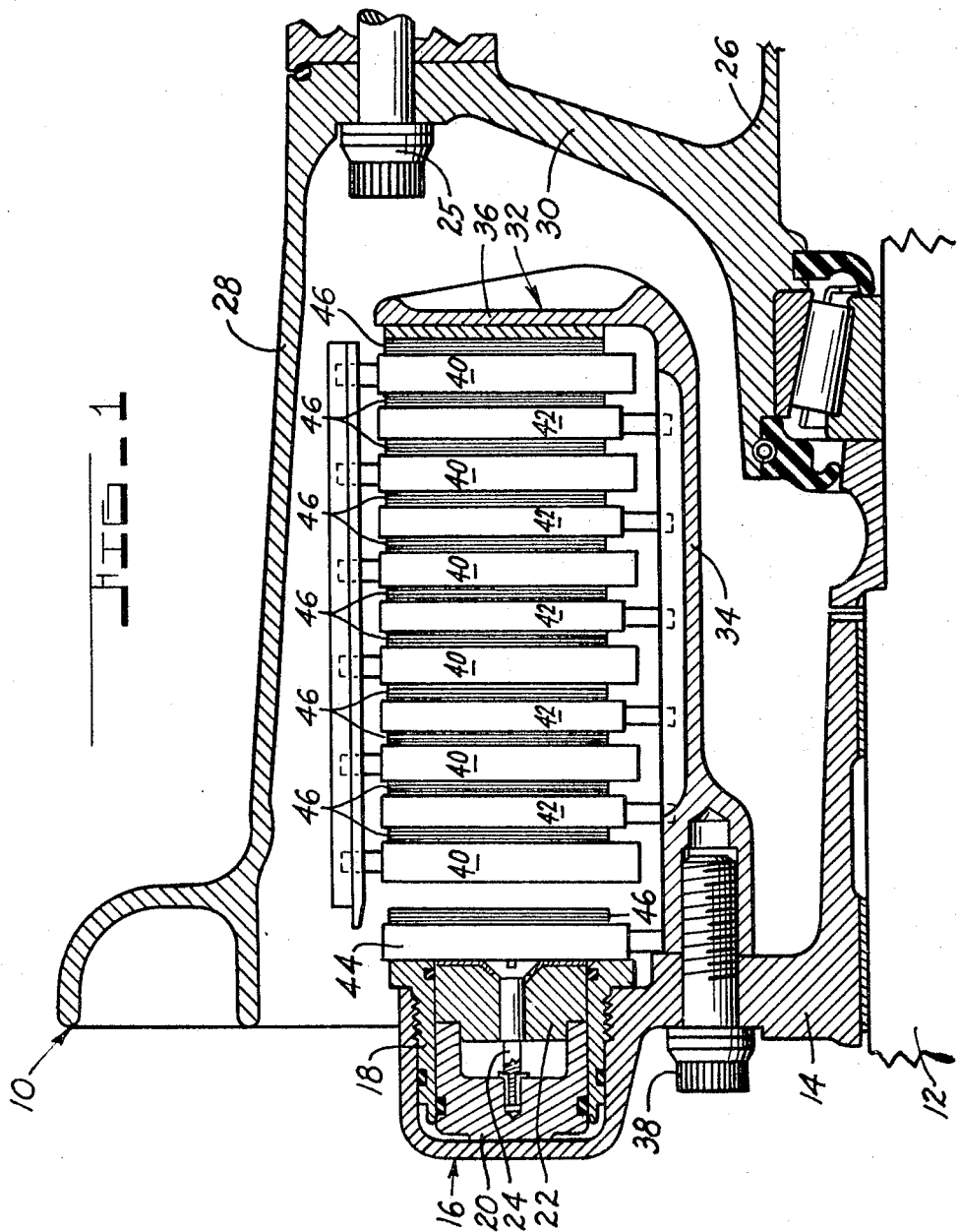
INVENTOR.
ORLA L. HOLCOMB, JR
BY
William N. Antonis
ATTORNEY.

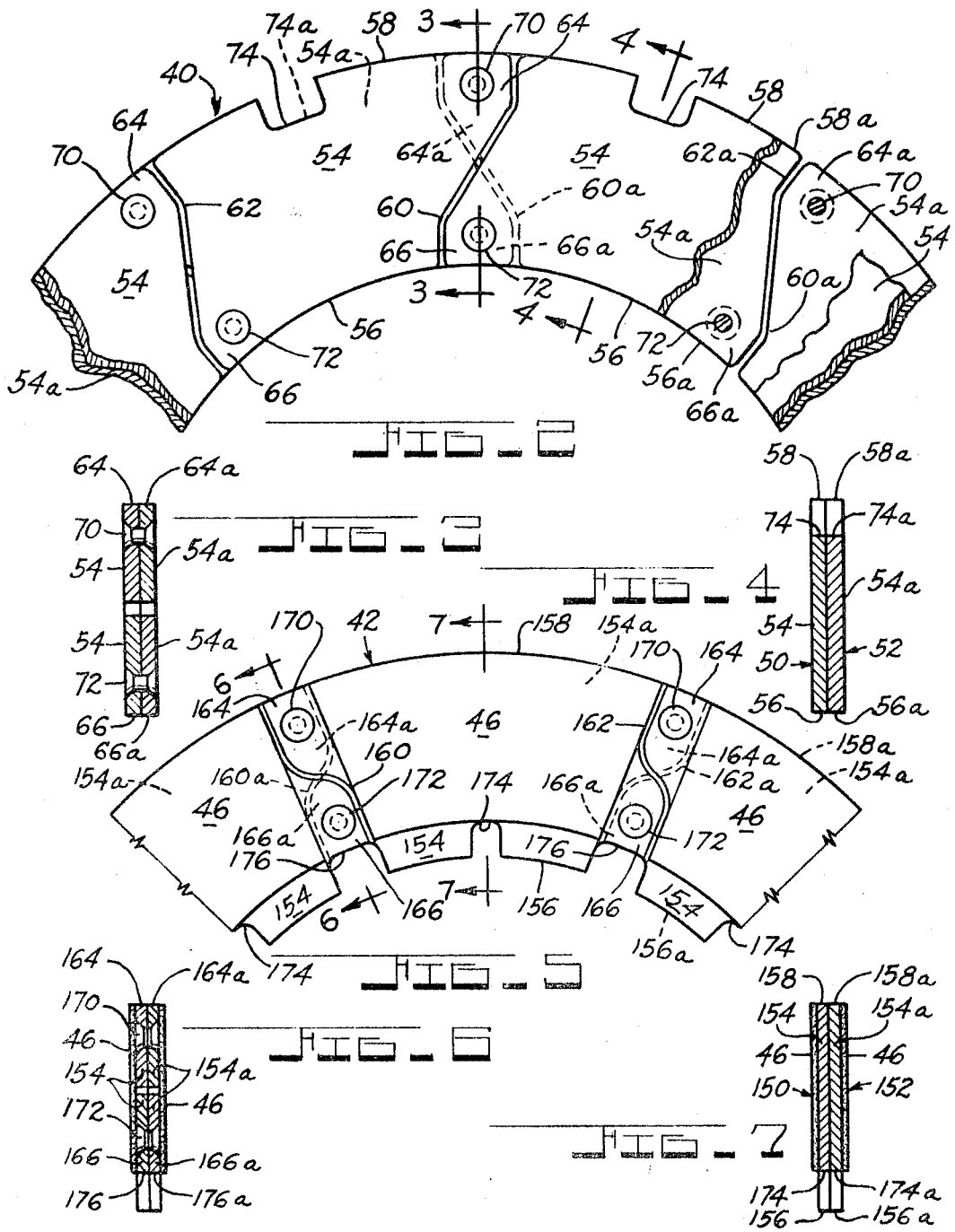

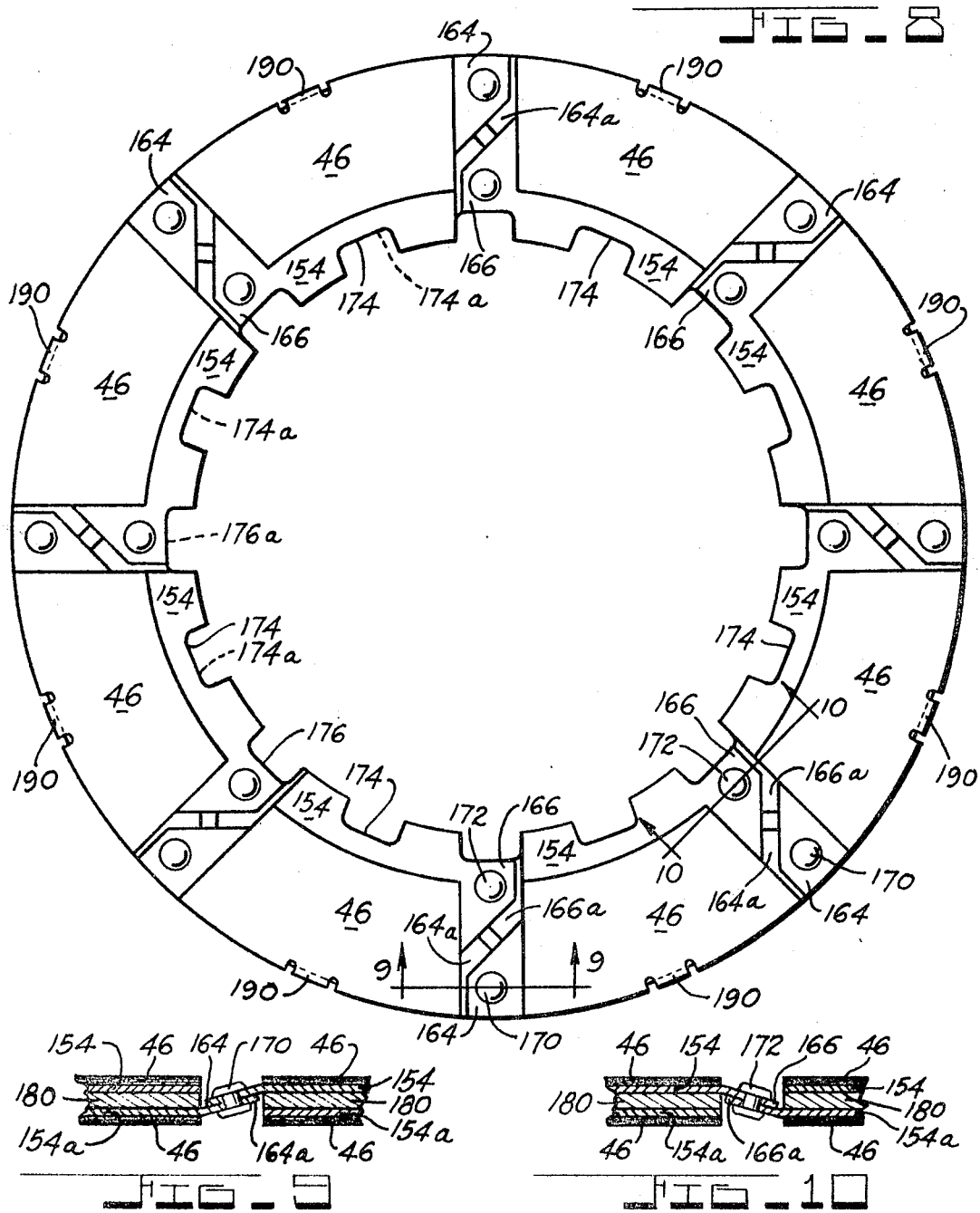

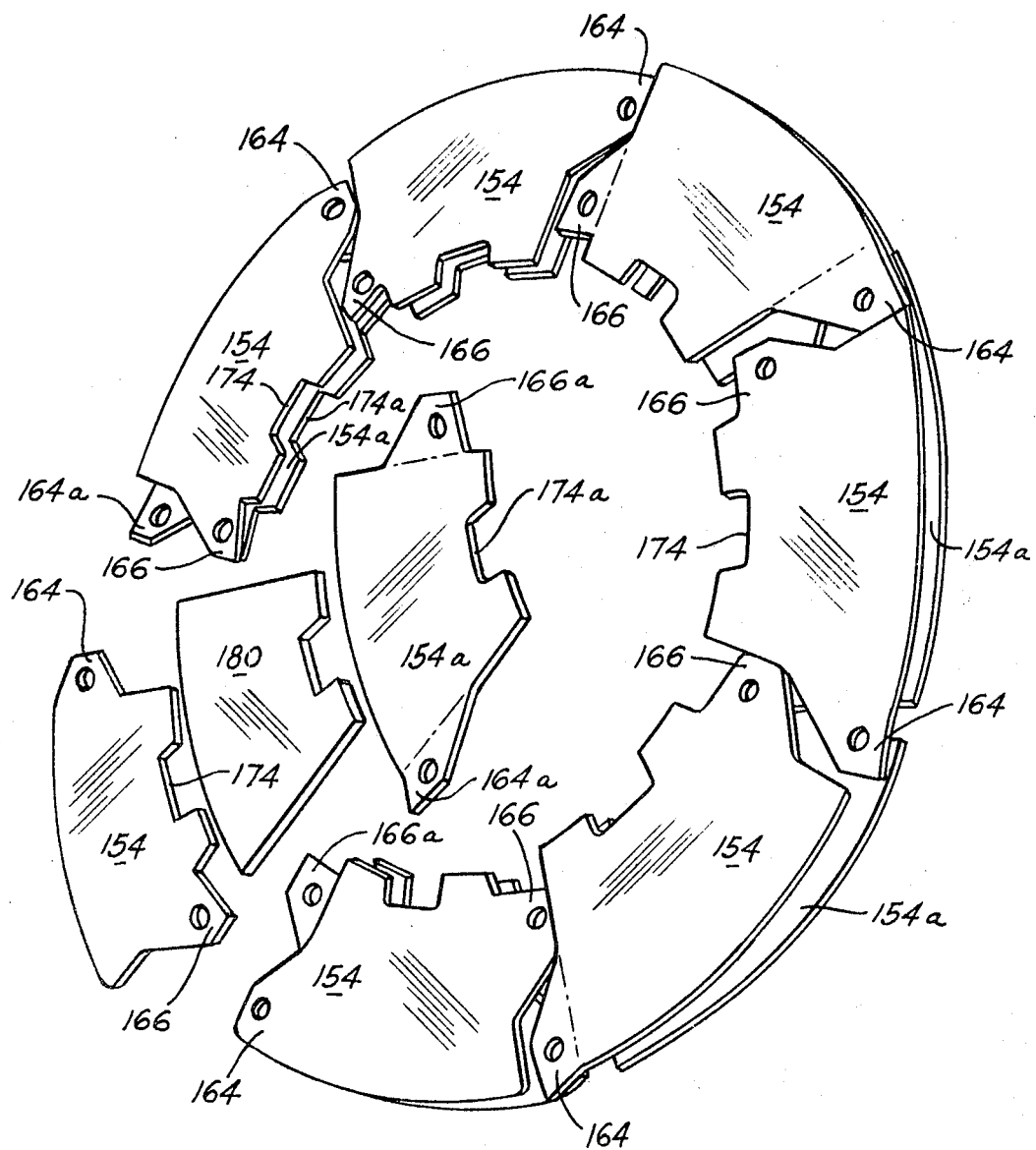

United States Patent Office 3,456,768
Patented July 22, 1969

3,456,768
DISC ELEMENT CONSTRUCTION FOR DISC BRAKE
Orla L. Holcomb, Jr., South Bend, Ind., assignor to The Bendix Corporation, a corporation of Delaware
Filed Nov. 20, 1967, Ser. No. 684,216
Int. Cl. F16d 65/12, 65/84
U.S. Cl. 188—218                  9 Claims

ABSTRACT OF THE DISCLOSURE

The following relates to a friction disc element construction for a disc brake which includes a pair of laminations formed of a plurality of annularly arranged segments. The segments of each lamination are connected to a pair of non-connected segments of the other lamination to form a chain of interwoven segments which allows a predetermined amount of relative motion between the segmented laminations. All of the segments of both laminations are symmetrically alike, but the segments of one lamination are allochirally arranged with respect to the segments of the other lamination.

BACKGROUND OF THE INVENTION

Disc brakes which utilize segmented annular disc elements arranged to permit individual thermal expansion of the disc segments without interference between adjacent segments are shown and described in various prior art patents, such as U.S. Patents 2,423,881; 2,683,504; 2,893,519; and 3,237,731. All disc brake elements to a greater or lesser degree, including those shown in the foregoing patents, tend to warp and wear upon extensive encounters with thermal shocks. Such warp and wear obviously will have a direct bearing on the effectiveness and life of any brake. In other words, higher degrees of warp and wear will reduce brake effectiveness and brake life, whereas, lesser degrees of warp and wear will increase brake effectiveness and brake life. Accordingly, any disc element construction which will eliminate or substantially reduce such warp and wear would constitute a significant advance in the art, and, particularly so, if such construction is less expensive than disc elements which are presently in use.

SUMMARY OF THE INVENTION

Accordingly, in view of the foregoing, it is an object of this invention to provide a unique friction disc element of the segmented type which will increase brake effectiveness and extend brake life.

Another object of this invention is to provide a segmented disc element which absorbs heat in a more uniform manner and withstands thermal shocks better than existing disc elements.

A further object of this invention is to provide a segmented disc element which is less expensive to fabricate than existing disc elements.

More specifically, it is an object of this invention to provide a disc element comprising first and second laminations formed of a plurality of annularly arranged segments, and means for connecting each segment of each lamination to a pair of non-connected segments of the other lamination to form a pair of interwoven segments. With such a completely segmented disc element, no auxiliary positioning or containment ring is required, and warpage, which is inherent in solid or semi-segmented disc elements, is eliminated.

Another object of this inveniton is to provide a disc element formed of a pair of segmented laminations of the aforementioned type, wherein all of the segments of both laminations are symmetrically alike, but the segments of one of said laminations are allochirally arranged with respect to the segments of the other of said laminations.

A further object of this invention is to provide a disc element of the aforemenitoned type wherein the disc element engages the wheel and brake assembly through key-slot engagement means and the predetermined amount of relative movement which is permitted between the segments of the laminations provides automatic adjustment of the key-slot torque reaction points.

A still further object of this invention is to provide a disc element which provides coulomb damping within the disc element.

An additional object of this invention is to provide a disc element of the aforementioned type which permits the inclusion of auxiliary thermal reservoirs which are not necessarily required to transmit braking (torque) forces.

Other objects, features, and advantages of the invention will be apparent from the following description of the invention taken in connection with the accompanying drawings.

BRIEF DESCRIPTION OF THE DRAWINGS

FIGURE 1 is a sectional view of a portion of a symmetrical wheel and brake assembly which incorporates the invention;

FIGURE 2 is a side elevational of a portion of a symmetrical rotor removed from the brake assembly of FIGURE 1 with portions broken away for clarity;

FIGURE 3 is a sectional view taken along line 3—3 of FIGURE 2;

FIGURE 4 is a sectional view taken along line 4—4 of FIGURE 2;

FIGURE 5 is a side elevation of a portion of a symmetrical stator removed from the brake assembly of FIGURE 1;

FIGURE 6 is a sectional view taken along line 6—6 of FIGURE 5;

FIGURE 7 is a sectional view taken along line 7—7 of FIGURE 5;

FIGURE 8 is a side elevation of a stator similar to that of FIGURE 5 with auxiliary thermal reservoirs sandwiched between the segmented laminations of the stator;

FIGURE 9 is a sectional view taken along line 9—9 of FIGURE 8;

FIGURE 10 is a sectional view taken along line 10—10 of FIGURE 8;

FIGURE 11 is an exploded perspective view of the stator shown in FIGURES 8, 9, and 10; and FIGURE 12 is a plan view of a segmented stator subassembly.

DESCRIPTION OF THE PREFERRED EMBODIMENTS

Referring to FIGURE 1, it will be seen that the wheel and brake assembly, which is illustrated includes a wheel 10 rotatably mounted on a stationary axle 12 and a stationary carrier member 14 which is connected to the axle through any suitable means, such as by a direct bolt connection (not shown). The construction for rotatably mounting the wheel 10 to axle 12 and fixing the stationary carrier member 14 to the axle 12 is well known, and a detailed description thereof is not deemed to be necessary. The carrier contains a plurality of fluid motors 16 each of which includes a protective sleeve 18 threadedly secured to the carrier and a piston 20 located and slidable in the sleeve. A block of insulating material 22 is secured to the head end of the piston by a threaded pin 24 for protecting the hydraulic brake fluid from the heat generated during braking. The wheel 10, which is formed of two sections fastened together by a plurality of bolts 25, includes a hub portion 26 and a rim portion 28 interconnected by a plurality of spokes 30. A torque tube 32 which includes a sleeve 34 and an annular backing plate flange 36 is fixedly secured to the carrier member 14 by a plurality of circumferentially spaced bolts 38.

The brake, which is illustrated, is of the disc type and includes a plurality of interleaved rotors 40 which are splined to and are rotated by the aircraft wheel 10, and includes stators 42 which are splined to sleeve 34 of the torque tube 32. The specific novel construction of the rotors and stators will be described hereinafter. Both the rotors and stators are movable axially and are sometimes referred to as a brake "stack." It is the frictional engagement of these relatively rotatable rotors and stators which produces the desired braking action on the aircraft wheel. A pressure plate 44, which is suitably attached to the fluid motor 16, forces the rotors 40 and stators 42 against each other upon activation of the motors by thrusting at one side of the stack and biasing the entire stack against the backing plate 36. Pressure plate 44, each of the stators 42, and the backing plate 36 have friction material lining 46 provided thereon.

Referring to FIGURES 2–4, which show the novel detailed construction of each of the rotors 40, it will be seen that each rotor is comprised of two laminations 50 and 52. One of the laminations 50 is formed of a plurality of annularly arranged segments 54 and the other of the laminations 52 is formed of a plurality of annularly arranged segments 54a. Both of the segments 54 and 54a are symmetrically alike, but it will be noted that the segments 54 of lamination 50 are allochirally arranged with respect to the segment 54a of the lamination 52. That is, segments 54 and 54a are symmetrically alike, but with parts reversed in position and arranged as to right and left, as one's hands.

Thus, it will be seen from the drawings that each segment 54 has a radially inner edge 56, a radially outer edge 58, two angularly disposed ends 60 and 62 extending therebetween, a first tab 64 located along the angularly disposed end 60 and projecting circumferentially along the radially outer edge 58 thereof, and a second tab 66 located along the other angularly disposed end 62 and projecting circumferentially along the radially inner edge 56 thereof. Since each segment 54a, as previously indicated, is symmetrically alike with each segment 54, like parts are designated by like numerals having a suffix a added thereto.

Referring to FIGURE 2, it will be seen that the outer tabs 64 of the segments 54 of lamination 50 and the inner tabs 66a of the segments 54a of lamination 52 extend in a clockwise direction, whereas the outer tabs 64a of the segments 54a of lamination 52 and the inner tabs 66 of the segments 54 of lamination 50 extend in a counterclockwise direction. With the segments 54 and 54a arranged in this manner it is possible to pivotally connect each segment 54 of lamination 50 to a pair of non-connected segments 54a of lamination 52 and, conversely, it is possible to pivotally connect each segment 54a of lamination 52 to a pair of non-connected segments 54 of lamination 50. Thus, it will be seen that the outer tab 64 of each segment 54 is pivotally connected through suitable fastening means, such as a rivet 70, to the outer tab 64a of the circumferentially displaced next adjacent segment 54a, and vice versa. Likewise, the inner tab 66 of each segment 54 is pivotally connected through suitable fastening means, such as a rivit 72, to the inner tab 66a of the circumferentially displaced next adjacent segment 54a, and vice versa. In other words, back-to-back segments 54 and 54a are not directly attached to each other. Each of the segments 54 and 54a are formed with a key-slot notch 74 and 74a, respectively, in the radially outer edges 58 and 58a thereof. Each of these notches slidably engage axially extending keys located on the inner periphery of the aircraft wheel 10. However, it will be understood that, if desired, the key-slot arrangement could be reversed so that the slots are formed in the wheel and the keys are formed on the outer edge of each segment.

The foregoing described disc element construction can also be utilized in connection with the stationary disc elements of an aircraft brake by moving the key-slot engaging means from the outer diameter of the disc element to the inner diameter thereof. More specifically, referring to FIGURES 5–7, wherein like parts are designated by like numerals, plus 100, it will be seen that the construction of each of the novel stators 42 is similar to that of the rotors 40. Thus, each stator is comprised of two laminations 150 and 152. One of the laminations 150 is formed of a plurality of annularly arranged segments 154 and the other of the laminations 152 is formed of a plurality of annularly arranged segments 154a. Both of the segments 154 and 154a are symmetrically alike and have, respectively, radially inner edges 156 and 156a, radially outer edges 158 and 158a, first angularly disposed ends 160, 160a, and second angularly disposed ends 162 and 162a extending therebetween, first tabs 164 and 164a located along the angularly disposed ends 160 and 160a and projecting circumferentially along the radially outer edges 158 and 158a thereof, and second tabs 166 and 166a located along the other angularly disposed end 162 and 162a and projecting circumferentially along the radially inner edges 156 and 156a thereof. Segments 154 and 154a are allochirally arranged with respect to each other and are pivotally connected to each other through suitable means, such as rivits 170 and 172 in the same manner previously described with respect to the rotors. Each of the segments 154 and 154a are formed with key-slot notches 174 and 174a, respectively, in the radially inner edges 156 and 156a thereof. In addition key-slot notches 176 and 176a, respectively, are formed in the radially inner edges 156 and 156a at the junction of segments 154 and 154a. Each of these notches slidably engage axially extending keys preferably formed as integral parts of torque absorbing member 34.

An embodiment wherein auxiliary thermal reservoirs 180 are included within a stator is shown in FIGURES 8–11. Since this embodiment utilizes essentially the same components and arrangements thereof which are shown in the embodiment of FIGURES 5–7, the same numerals for like parts will be applied thereto and a detailed explanation relating thereto is deemed unnecessary. However, it should be noted that in the instant embodiment the pivot point outer tabs 164 and 164a and the pivot point inner tabs 166 and 166a are bent inwardly toward the center of the disc element so as to form pockets between opposing segments 154 and 154a. The auxiliary thermal reservoirs 180, which are formed of any suitable material, such as beryllium, beryllium oxide, graphite, etc., are located within these pockets. Radial retention or containment of the reservoirs can be accomplished by retention tabs 190 or other suitable means. With such a sandwich type ararngement free differential thermal expansion between the auxiliary thermal reservoir and the structural components can occur, since the auxiliary reservoirs are not necessarily affixed to the structural segments.

In all of the foregoing embodiments the symmetrical allochirally arranged segments are pivotally connected to each other in an interwoven fashion so that back-to-back segments are not directly attached to each other. The fastener design is such as to permit free rotation or pivoting of the segments about the fastener. The effects of thermal cycling are thus isolated to each segment, eliminating the warpage inherent to a continuous or slotted ring.

In addition a predetermined amount of circumferential clearance is provided between opposing laminations, so that motion variations of one segment are not directly imparted to its opposing segment. Such motion variations, such as vibrations caused by "stick-slip" changes of friction coefficients or loads, are not directly imparted from one friction surface to another. Cumulative vibration forces between surfaces of the disc element are thus circumvented.

Because of the aforementioned structural arrangement the cascading effect of locally high friction, the inherent difference between dynamic and static (or near static) coefficients of friction, and the resultant brake vibrations are minimized. In addition, the provided relative motion, the brake actuating force normal to the disc segments, and the inherent coefficient of friction between segments combine to provide coulomb damping within the disc element.

In the stator embodiments torque is reacted at the key slot notches formed in the inside diameter of the disc element. In the rotor embodiment, torque is reacted by the key slot notches in the outside diameter of the disc element. Note FIGURE 12 which illustrates the mechanics of adjustment between torque reaction points in a stator as shown with respect to a segmented stator sub-assembly for clarity. From the drawing it will be seen that pivot points A, B, and C are nearly co-linear. The point B can thus be displaced laterally small amounts without disturbing to any significant degree the remaining pivot points of the assembly. Movement of the segment S about the pivot point A will cause a torque reaction point of segment S to advance counterclockwise a distance x. Concurrently, the comparable torque reaction point of segment T regresses clockwise the lesser amount y. In such manner, therefore, tolerances or variations of the male spline circular pitch are compensated for. At least half of the torque reaction points are adjustable the distance x. Moreover, it will be apparent that upon rotation of the segment R about pivot point H, the braking forces upon the segments will cause automatic orientation of the segments such that torque is indeed reacted at x.

The several practical advantages which flow from this invention are believed to be obvious from the foregoing description, and other advantages may suggest themselves to those who are familiar with the art to which the invention relates.

Furthermore, although this invention has been described in connection with certain specific embodiments, it will be obvious to those skilled in the art that various changes may be made in the form, structure, and arrangement of parts without departing from the spirit of the invention.

Having thus described the various features of the invention, what I claim as new and desire to secure by Letters Patent is:

1. In a wheel and brake assembly having axially extending key-slot type engaging means, a friction disc element comprising first and second laminations formed of a plurality of annularly arranged symmetrically alike segments each having a radially inner edge, a radially outer edge, and two angularly disposed ends extending therebetween, means for connecting each segment of each lamination to a pair of non-connected segments of the other lamination to form a chain of interwoven segments, said connecting means comprising first and second tabs projecting from each segment, said first tab being located along one of said angularly disposed ends and projecting circumferentially along the radially outer edge thereof and said second tab being located along the other of said angularly disposed ends and projecting circumferentially along the radially inner edge thereof, said segments of said first lamination being allochirally arranged with respect to said segments of said second lamination so that each segment of said first lamination is connected to a pair of non-connected segments of said second lamination through corresponding tabs of said non-connected segments, and mating key-slot type engaging means operatively connected to said disc element for slidable engagement with said first mentioned key-slot type engaging means.

2. The structure, as defined in claim 1, wherein the first tabs of said segments are connected only to each other by rivet means and the second tabs of said segments are connected only to each other by rivet means.

3. The structure, as defined in claim 2, wherein said first tabs of the segments in said first lamination and said second tabs of the segments in said second lamination extend in a clockwise direction, and said first tabs of the segments in said second lamination and said second tabs of the segments in said first lamination extend in a counter-clockwise direction.

4. The structure, as defined in claim 3, wherein said mating key-slot type engaging means is formed in the radially outer edges of said segments.

5. The structure, as defined in claim 3, wherein said mating key-slot type engaging means is formed in the radially inner edges of said segments.

6. In a wheel and brake assembly having axially extending key-slot engaging means, a friction disc element comprising first and second laminations formed of a plurality of annularly arranged arcuate segments each having a radially inner edge, a radially outer edge, two angularly disposed ends extending therebetween, a first tab located along one of said angularly disposed ends and projecting circumferentially along the radially outer edge thereof, and a second tab located along the other of said angularly disposed ends and projecting circumferentially along the radially inner edge thereof, said segments of said first lamination being allochirally arranged with respect to said segments of said second lamination so that said first tab of each segment in said first lamination is pivotally connected to said first tab of each circumferentially displaced next adjacent segment of said second lamination and said second tab of each segment in said first lamination is pivotally connected to said second tab of each circumferentially displaced next adjacent segment of said second lamination, and mating key-slot type engaging means operatively connected to said disc element for slidable engagement with said first mentioned key-slot type engaging means.

7. The structure, as defined in claim 6, wherein said pivotal connections include fastening means for permitting free movement of said segments about said fastening means and automatic adjustment of the torque reaction points of said first and second mentioned key-slot type engaging means.

8. The structure, as defined in claim 6, which includes an auxiliary thermal reservoir sandwiched between each pair of back-to-back segments of said first and second laminations.

9. The structure, as defined in claim 7, wherein said first-mentioned key-slot type engagnig means includes a plurality of axially extending keys, and said second-mentioned mating key-slot type engaging means includes a plurality of slots for receiving said keys.

References Cited

UNITED STATES PATENTS

| 2,561,445 | 7/1951 | McCune. |
| 2,753,032 | 7/1956 | Eason. |
| 3,010,543 | 11/1961 | Pear. |
| 3,376,960 | 4/1968 | Bender _____ 188—218 |

FOREIGN PATENTS

| 1,489,877 | 6/1967 | France. |
| 871,861 | 7/1961 | Great Britain. |
| 906,629 | 9/1962 | Great Britain. |

GEORGE E. A. HALVOSA, Primary Examiner

U.S. Cl. X.R.

188—264; 192—107